Patented Feb. 19, 1935

1,991,783

UNITED STATES PATENT OFFICE 1,991,783

BISMUTH SALTS OF ORGANIC CARBOXYLIC ACIDS

Max Bockmühl and Walther Persch, Frankfort-on-the-Main, Germany, assignors to Winthrop Chemical Company, Inc., New York, N. Y., a corporation of New York No Drawing. Application March 16, 1932, Serial No. 599,338. In Germany March 21, 1931

1 Claim. (Cl. 260—11)

The present invention relates to bismuth salts of organic carboxylic acids and to a process of preparing them.

Organic bismuth compounds have recently become important for the therapy of syphilis. Bismuth compounds have, for instance, been prepared by causing bismuth oxide to act upon camphocarboxylic acid $C_{11}H_{16}O_3$ (cf. French Patents No. 657,694, dated January 4, 1928, in the name of Marius-Louis Picon and addition thereto No. 35,081) or by causing a bismuth salt to act upon camphoric acid esterified in one of the two carboxyl groups, e. g. upon the ethyl ester compound $C_{12}H_{20}O_4$ (see German Patent No. 461,830, dated November 18, 1924, in the name of Chemisch-Pharmazeutische Akt. Ges., Bad Homburg and Arthur Liebrecht).

Now we have found that new valuable bismuth compounds are obtainable by causing a bismuth salt to act upon the unsaturated acid of the formula $C_9H_{14}O_2$, which is obtainable in the following manner as by-product in the process of oxidizing by means of chromic acid terpene alcohols of a technically pure state, such as borneol, isoborneol or fenchyl alcohol, and unsaturated cyclic terpenes of the formula $C_{10}H_{16}$, such as camphene or fenchene, which are also present as contaminations in the aforesaid technically pure terpene alcohols. This oxidation process is, for instance, carried out in the technical manufacture of synthetic camphor. Thus, the known manufacture of camphor from turpentine oil or from its main constituent, pinene, includes the step of subjecting to an oxidation process, in solution in, for instance, benzene, by means of chromic acid and sulfuric acid, the camphene, borneol or isoborneol, which in the course of the said manufacture are obtained as intermediate products in a commercially pure state, that is to say, contaminated with small quantities of the aforesaid other cyclic terpene derivatives. The benzene layer containing the camphor and other oxidation products is separated and then washed with an aqueous alkali solution, for example with caustic soda solution; the washed benzene layer containing the camphor is separated from the alkaline aqueous layer and the latter is freed, if desired, from traces of benzene and camphor, and other volatile constituents by steam distillation. The aqueous solution so obtained is acidified, for instance by addition of hydrochloric acid, whereby there is precipitated an oil which forms a deposit at the bottom of the vessel. This oil can easily be separated from the supernatant liquid, e. g. by siphoning off. The oil thus obtained is subjected to a fractional distillation under a reduced pressure, whereby the unsaturated acid $C_9H_{14}O_2$ is obtained. Its accurate constitution is not yet known. The acid forms a golden-yellow oil and boils at between 120° C. and 125° C. under 1 mm. pressure; it has the specific gravity of 1.0057; the methyl ester of the acid boils at 70° C. under 4 mm. pressure.

The new bismuth compounds obtained by causing a bismuth salt to act upon the unsaturated acid $C_9H_{14}O_2$ are yellowish amorphous substances, which decompose without melting when heated. The new compounds are insoluble in water, soluble in ether, chloroform and oils and have a strong bactericidal action especially against spirilli, but only a comparatively small toxicity. The relation between the curing dose and the toxic dose, the so-called chemotherapeutic index, shows the great advantages which distinguish the new compounds from the known bismuth compounds of the camphocarboxylic acid and the camphoric acid esters. Whereas the chemotherapeutic index (dosis curativa: dosis toxica), when treating rabbit syphilis with the bismuth compound of the camphoric acid methyl ester is only from 1:50 to 1:100, and whereas the index for the bismuth compound of the camphor carboxylic acid is only 1:200, the chemotherapeutic qualities for the bismuth compound described in Example 1 following hereafter are more than two to ten times better than those of the said known compounds; the index for the product of Example 1 is 1:500. The product of the Example 2 given below has the same favorable index.

The process is preferably carried out by dissolving the unsaturated acid $C_9H_{14}O_2$ in sodium carbonate solution or by suspending the acid in water and adding sodium carbonate solution, until a neutral solution is obtained. To this solution a solution of a bismuth salt, e. g. an aqueous solution of bismuth nitrate or bismuth trichloride, preferably containing glycerin, is added, advantageously in small portions. It is advisable to add simultaneously to the solution of the acid an aqueous solution of the salt of an organic acid, for instance, an aqueous solution of sodium acetate. When adding the solution of the bismuth salt in the aforesaid manner the new compound is precipitated. The precipitate obtained may be purified, for instance, by washing with water, dissolving the washed precipitate in an organic solvent, e. g. in chloroform freeing this solution from water and separating the bismuth compound from the dried chloroform solution, e. g. by evaporating the chloroform.

Instead of the purified unsaturated acid $C_9H_{14}O_2$ there may be subjected to the same process, the crude oil obtained by adding a mineral acid, for instance hydrochloric acid to the purified alkaline aqueous solution of the by-product obtainable in the aforesaid manner, for instance, in the manufacture of camphor. By treating this crude oil containing the unsaturated acid in the described manner new bismuth compounds of the same properties can be obtained as the compounds which are obtainable by treating as described above the unsaturated acid $C_9H_{14}O_2$ separated in a pure state from this crude oil. It, therefore, is not necessary to separate the acid $C_9H_{14}O_2$ from this crude oil before subjecting it to the present process.

The following examples illustrate the invention:

1. Technically pure camphene or borneol or isoborneol are oxidized by means of chromosulfuric acid in a benzene solution. The mixture is washed with an aqueous alkaline solution. After removal of traces of benzene and camphor, the aqueous alkaline solution is acidified, the oil thus obtained is separated and subjected to a fractional distillation process. The fraction boiling between about 120° C. and about 125° C. under 1 mm. pressure constitutes the acid $C_9H_{14}O_2$. 13.86 grams of this acid are suspended in 50 cc. of water and the suspension is exactly neutralized by means of sodium carbonate solution. To this solution there is added a solution of 14.55 grams of crystallized bismuth nitrate $(Bi[NO_3]_3.5H_2O)$ and 30 cc. of glycerin in 60 cc. of water and simultaneously a solution of 7.38 grams of anhydrous sodium acetate in 50 cc. of water is slowly added. A yellow precipitate is formed which is thoroughly triturated with water and then dissolved in chloroform. The solution so obtained is dried with sodium sulfate. By evaporation of the chloroform there is obtained from the solution the new bismuth compound in the form of a yellow amorphous body which is insoluble in water, but soluble in ether, chloroform and oils. The new compound which decomposes without melting when heated has the formula $(C_9H_{13}O_2)_3Bi$.

2. 14.04 grams of the saturated acid of the formula $C_9H_{16}O_2$ (obtainable by catalytic reduction of the unsaturated acid used in Example 1) are dissolved in 50 cc. of water by means of sodium carbonate to a neutral solution and alternately mixed with a solution of 14.55 grams of crystallized bismuth nitrate in 60 cc. of water and 30 cc. of glycerin and a solution of 7.38 grams of sodium acetate in 50 cc. of water. After the precipitate obtained has been well washed with water, it is dissolved in chloroform and the solution is dried. By evaporation of the chloroform there is obtained the bismuth salt of the saturated acid $C_9H_{16}O_2$, which is insoluble in water, but easily soluble in ether, chloroform and oils. The new compound has the formula $(C_9H_{15}O_2)_3Bi$.

3. 10.7 grams of bismuth trichloride are dissolved in 8.5 cc. of concentrated hydrochloric acid and 25 cc. of water and this solution is added to a solution of 15.7 grams of the unsaturated acid $C_9H_{14}O_2$, 8.5 grams of caustic soda solution and 30 cc. of water. The precipitate formed is filtered by suction and dissolved in chloroform. After the chloroform solution has been clarified and dried, the chloroform is evaporated. The bismuth salt obtained is identical with that described in Example 1.

We claim:

The bismuth salt of the acid of the formula $C_9H_{14}O_2$, obtainable as by-product by oxidation of a compound of the group consisting of cyclic terpenes, unsaturated cyclic terpenes, hydroxylated cyclic terpenes and hydroxylated unsaturated cyclic terpenes, said salt having the formula $(C_9H_{13}O_2)_3Bi$ and being a yellowish, amorphous substance, insoluble in water, soluble in ether, chloroform and oils, decomposing without melting when heated and having a strong bactericidal action, especially against spirilli.

MAX BOCKMÜHL.
WALTHER PERSCH.